United States Patent [19]

Geke et al.

[11] Patent Number: 5,330,564
[45] Date of Patent: Jul. 19, 1994

[54] AQUEOUS COATING FOR PROTECTING SPRAY CABINS FROM ENAMEL OVERSPRAY AND PROCESS FOR PRODUCING IT

[75] Inventors: Juergen Geke, Duesseldorf; Bernhard Zange, Morsbach-Birken; Hans Rehm, Hilden; Hans Fehr, Duesseldorf; Thomas Molz, Hilden; Kurt Buick, Neuss; Emil Bruegel, Grevenbroich; Lutz Huesemann, Haan, all of Fed. Rep. of Germany

[73] Assignee: Henkel Kommanditgesellschaft auf Aktien, Duesseldorf, Fed. Rep. of Germany

[21] Appl. No.: 842,362

[22] PCT Filed: Sep. 17, 1990

[86] PCT No.: PCT/EP90/01570

§ 371 Date: May 26, 1992

§ 102(e) Date: May 26, 1992

[87] PCT Pub. No.: WO91/04303

PCT Pub. Date: Apr. 4, 1991

[30] Foreign Application Priority Data

Sep. 25, 1989 [DE] Fed. Rep. of Germany ....... 3931907

[51] Int. Cl.$^5$ ................................................ C09D 5/20
[52] U.S. Cl. .......................................... 106/2; 210/698; 210/728; 210/729; 210/930; 252/DIG. 8; 134/38
[58] Field of Search .................... 55/85; 210/696, 698, 210/723, 728, 930, 729; 252/DIG. 8; 106/2; 427/352, 353; 134/38

[56] References Cited

U.S. PATENT DOCUMENTS

| | | | |
|---|---|---|---|
| 2,563,499 | 8/1951 | Smith | 106/2 |
| 3,455,712 | 7/1969 | Webb | 106/157 |
| 3,476,575 | 11/1969 | Arnold | 106/2 |
| 4,125,476 | 11/1978 | Dean | 210/930 |
| 4,220,456 | 9/1980 | Block | 55/85 |
| 4,380,495 | 4/1983 | Maher | 210/728 |
| 4,496,374 | 1/1985 | Murphy | 55/84 |
| 4,541,931 | 9/1985 | Geke et al. | 210/728 |
| 4,629,477 | 12/1986 | Geke | 55/85 |
| 4,629,572 | 12/1986 | Leitz et al. | 210/714 |
| 4,701,220 | 10/1987 | Seng | 106/203 |
| 4,853,132 | 8/1989 | Merrell et al. | 210/712 |
| 4,933,091 | 6/1990 | Geke et al. | 210/712 |

Primary Examiner—Anthony Green
Attorney, Agent, or Firm—Ernest G. Szoke; Wayne C. Jaeschke; Norvell E. Wisdom, Jr.

[57] ABSTRACT

Aqueous and storage-stable compositions for the deposition of temporary barrier layers on spray-coating booths and the like contain 5 to 80% by weight of one or more $C_8$-carboxylic acid and/or an alkali metal salt thereof, 1 to 40% by weight of a pH-regulator consisting of one or more alkanol amine and/or alkali metal hydroxide, and 1 to 15% by weight of one or more layered silicate and/or polyacrylate and/or carboxymethylcellulose, together with water and any further desired additives, and have a pH value of 6 to 10 and a viscosity of 30 to 50 DIN-sec.

The invention also provides a process for the production of such compositions.

20 Claims, No Drawings

AQUEOUS COATING FOR PROTECTING SPRAY CABINS FROM ENAMEL OVERSPRAY AND PROCESS FOR PRODUCING IT

The invention relates to aqueous and storage-stable compositions for the deposition of a subsequently-removable barrier layer upon internal surfaces of spray-coating booths and the like, and a process for their production.

During painting processes carried out in spray-coating booths, surfaces inside the booth—particularly floors, gratings, pipes and other equipment—are liable to become coated in excess paint. To facilitate the removal of these unwanted paint layers, it is common practice to pre-coat the surfaces which may be affected with protective coatings or barrier layers, which are relatively easily removable. These protective coating layers and paint layers have previously been removed by washing down with warm or hot water, by dissolution with solvents, or by mechanical treatment. Besides the ability easily to be removed, further requirements of the protective coatings are that they are not coloured, and do not absorb light but are instead reflective.

U.S. Pat. No. 2,563,499 describes a protective coating which, together with the adhering paint-spray, can be removed with only warm or hot water. The protective coating was produced from an aqueous suspension of a colouring pigment and a colloidal clay together with an emulsion of a paraffin wax. Oleic acid/triethanolamine or mixed polyether-sorbitan monopalmitate was used as the emulsifier.

U.S. Pat. No. 3,476,575 describes a protective coating which consists of an aqueous emulsion of a terpenehydrocarbon polymer, an oil, wax, a fatty-acid salt as the emulsifier, and a colouring pigment. In addition, it can also contain other usual additives, as well as fillers, thickening agents, preservatives and antioxidants. This protective coating can also be removed optimally with only hot water or steam.

The use of solvents, oils and waxes in coating compounds can lead to severe impairment of the coagulation effect following their disposal in the water circulating in the coagulation section. Large amounts of these solvents are not collected, but instead enter the water circulating in the coagulation streams. In addition, the use of emulsifiers can lead to foam formation.

The basic aim of the invention is to prepare a storage-stable protective coating composition which after use is easy to remove from treated surfaces with cold water, and which is free from solvents and oil and does not contain emulsifiers. The components of the formulation should not lead to emulsion formation with paint constituents to cause a separate effluent problem, for example de-emulsification. The aim is also to be achieved by using ecologically, toxicologically, and particularly aquatically safe formulations, and biodegradable substances.

According to the invention there are provided aqueous, storage-stable compositions for the deposition of temporary barrier layers on spray-coating booths and the like, which compositions contain 5 to 80% by weight of one or more $C_8$-carboxylic acid and/or an alkali metal salt thereof,
1 to 40% by weight of a pH-regulator consisting of one or more alkanol amine and/or alkali metal hydroxide, and
1 to 15% by weight of one or more layered silicate and/or polyacrylate and/or carboxymethylcellulose, and have a pH value of from 6 to 10, and a viscosity of 30 to 50 DIN-sec.

The preferred carboxylic acid is 2-ethyl-hexanoic acid, which is preferably used in a proportion of from 10 to 25% by weight. The sodium or potassium salts of this acid may also be used, either alone or in mixture with the acid.

As the pH-regulator, monoethanolamine and/or triethanolamine are preferably used, either alone or in mixture with sodium hydroxide or potassium hydroxide. Alkanolamine-free formulations are equally possible when the pH value is controlled by an alkali metal hydroxide.

Layered silicates are used as a thixotropic and/or thickening agent. Bentonites, hectorites, laponites or saponites are preferred for this purpose. Alternatively, polyacrylates and/or carboxymethylcellulose can be used in place of, or in mixture with, the layered silicates. These components are preferably used in a proportion of from 3 to 8% by weight.

The pH values of the total formulations lie between pH 6 and 10, preferably between pH 7 and 8; their viscosity values (according to DIN 53 211) lie between 30 and 50 DIN-sec, but preferably between 35 and 40 DIN-sec.

Apart from the carboxylic acid-, pH-regulator and thixotropic agent mentioned above, the remainder of the composition is made up of water and, if required for special reasons, further additives. Such additives may in particular be hydrophobizing release agents, flow improvers, coloring pigments and corrosion inhibitors.

Suitable hydrophobizing release agents are glycerin esters, preferably glycerin mono-oleate, and/or metallic soaps, preferably calcium stearate. These may be used in a proportion of 0 to 20% by weight, preferably from 1 to 20% by weight.

Polyhydric alcohols, preferably glycerine or ethylene glycol, may be used as the flow improvers. Suitable quantities are again from 0 to 20% by weight, preferably from 1 to 20% by weight.

The preferred coloring pigment is titanium dioxide, used in proportions of 0 to 5% by weight, particularly from 1 to 5% by weight.

As corrosion inhibitors for non-ferrous metals and ferrous metals, there are preferably used alkanolamines, tolyl triazole or sodium- or potassium salts of $C_8$–$C_{18}$-carboxylic acids (fatty acids), in proportions of 0 to 10% by weight, particularly from 1 to 10% by weight.

The formulations according to the invention are used as concentrates, without further dilution with water. They may be applied by means of any suitable application devices, for example pumps.

The invention also relates to a process for the production of storage-stable, homogeneous compositions as defined above, in which process the layered silicate (for example bentonite) and where appropriate the pigment is stirred into the water and then exposed to a high shear gradient.

Suitable devices for the production of a high shear gradient are, for example, Cavitron or Supraton or comparable devices.

Following this homogenization stage there is at least a two hour, preferably a two to three hour, swelling time or maturing time. The aqueous solution of the $C_8$-carboxylic acid (for example 2-ethylhexanoic acid)

neutralized with the pH-regulator (for example triethanolamine) is then stirred into this mixture, and after the addition of any further desired components is exposed again to a high shear gradient and homogenized.

Comparative production experiments, using methods differing from the process according to the invention, produced inferior results as regards homogeneity, storage-stability and thixotropy.

EXAMPLES

Examples of compositions according to the invention are given below, for the purpose of illustration only.

1.
   20% by weight monoethanolamine
   10% by weight calcium stearate
   10% by weight glycerine mono-oleate
   5% by weight bentonite
   10% by weight 2-ethylhexanoic acid
   45% by weight water 2.
   15% by weight triethanolamine
   10% by weight glycerine
   5% by weight bentonite
   1% by weight titanium dioxide
   10% by weight glycerine mono-oleate
   20% by weight 2-ethylhexanoic acid
   39% by weight water 3.
   % by weight sodium hydroxide
   10% by weight calcium stearate
   10% by weight glycerine mono-oleate
   5% by weight bentonite
   10% by weight 2-ethylhexanoic acid
   55% by weight water

We claim:

1. An aqueous and storage stable coating composition to protect spray booths against lacquer overspray, which composition after use is easy to remove from the treated surface with cold water and comprises:
   5 to 80% by weight of material selected from the group consisting of $C_8$ carboxylic acids and the alkali metal salts thereof;
   1 to 40% by weight of pH regulator material selected from the group consisting of alkanolamines and alkali metal hydroxides;
   1 to 15% by weight of material selected from the group consisting of layered silicates, polyacrylates, carboxymethylcellulose, and mixtures thereof; and, optionally,
   additives selected from the group consisting of hydrophobizing release agents, flow improvers, coloring pigments, and corrosion inhibitors; and
   as the balance, water,
and has a pH value from 6 to 10; and has a viscosity from 30 to 50 DIN-sec.

2. A coating composition according to claim 1, wherein 2-ethyl hexanoic acid or sodium or potassium salts of this acid in an amount of from 10 to 25% by weight are used as the $C_8$ carboxylic acid or alkali metals salts thereof.

3. A coating composition according to claim 2, wherein the pH regulator material is selected from the group consisting of monoethanol amine, triethanolamine, sodium and potassium hydroxides, and mixtures thereof.

4. A coating composition according to claim 3, wherein the material selected from the group consisting of layer silicates, polyacrylates, carboxymethylcellulose, and mixtures thereof is used in an amount from 3 to 8% by weight and at least one layer silicate selected from the group consisting of bentonites, hectorites, laponites, and saponites is present in the composition.

5. A coating composition according to claim 4, wherein glycerine mono-oleate, calcium stearate, or both are used as additives in the composition in a total amount that does not exceed 20% by weight.

6. A coating composition according to claim 5, wherein glycerine or ethylene glycol, is used as an additive in the composition in a amount not greater than 20% by weight.

7. A coating composition according to claim 6, wherein titanium dioxide is used as an additive in the composition in an amount not greater than 5% by weight.

8. A coating composition according to claim 7, wherein tolyltriazole or a sodium or potassium salt of a $C_9$–$C_{18}$ carboxylic acid is used as additive in the composition in an amount not greater than 10% by weight as a corrosion inhibitor.

9. A coating composition according to claim 8, wherein the pH value is between 7 and 8.

10. A coating composition according to claim 9, wherein the viscosity lies between 35 and 40 DIN-sec.

11. A process for producing an aqueous and storage stable coating composition to protect spray booths against lacquer overspray, said coating composition being easy to remove from the treated surface with cold water after use, wherein, in a first step, 1 to 15% by weight of material selected from the group consisting of layer silicates, polyacrylates, carboxymethyl cellulose, and mixtures thereof, and, optionally, pigments, are mixed with water and exposed to a high shear gradient to produce a first intermediate mixture; then after at least two hours of swelling time there is added to this first intermediate mixture a second intermediate aqueous mixture, prepared in a separate step, the second intermediate mixture consisting of 1 to 40% by weight of pH regulator material that is selected from the group consisting of alkanol amines, alkali hydroxides, and mixtures thereof and of 5 to 80% by weight of material selected from the group consisting of $C_8$ carboxylic acids, alkali metal salts of $C_8$ carboxylic acids, and mixtures thereof, and, optionally, additives selected from the group consisting of hydrophobizing release agents, flow improvers, coloring pigments, and corrosion inhibitors, and the composition formed by mixing the second intermediate mixture into the first intermediate mixture is again exposed to a high shear gradient to produce the coating composition.

12. A coating composition according to claim 1, wherein the pH regulator material is selected from the group consisting of monoethanol amine, triethanolamine, sodium and potassium hydroxides, and mixtures thereof.

13. A coating composition according to claim 1, wherein the material selected from the group consisting of layer silicates, polyacrylates, carboxymethylcellulose, and mixtures thereof is used in an amount from 3 to 8% by weight and at least one layer silicate selected from the group consisting of bentonites, hectorites, laponites, and saponites is present in the composition.

14. A coating composition according to claim 1, wherein glycerine esters, metallic soaps, or both are used as additives in the composition and the total amount of glycerine esters and metallic soaps does not exceed 20% by weight.

15. A coating composition according to claim 1, wherein a polyfunctional alcohol is used as an additive in the composition in a amount not greater than 20% by weight.

16. A coating composition according to claim 1, wherein a pigment is used as an additive in the composition in an amount not greater than 5% by weight.

17. A coating composition according to claim 16, wherein the pigment is titanium dioxide.

18. A coating composition according to claim 1, wherein tolyltriazole or a sodium or potassium salt of a $C_9$–$C_{18}$ carboxylic acid is used as additive in the composition in an amount not greater than 10% by weight as an corrosion inhibitor.

19. A coating composition according to claim 1, wherein the pH value is between 7 and 8.

20. A coating composition according to claim 1, wherein the viscosity lies between 35 and 40 DIN-sec.